(12) United States Patent
Naraki

(10) Patent No.: US 10,862,812 B2
(45) Date of Patent: Dec. 8, 2020

(54) INFORMATION PROCESSING APPARATUS, DATA MANAGEMENT SYSTEM, DATA MANAGEMENT METHOD, AND NON-TRANSITORY COMPUTER READABLE MEDIUM STORING PROGRAM

(71) Applicant: TOYOTA JIDOSHA KABUSHIKI KAISHA, Toyota (JP)

(72) Inventor: Mika Naraki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 16/238,555

(22) Filed: Jan. 3, 2019

(65) Prior Publication Data

US 2019/0222524 A1 Jul. 18, 2019

(30) Foreign Application Priority Data

Jan. 18, 2018 (JP) .................................. 2018-006577

(51) Int. Cl.
*H04L 12/825* (2013.01)
*H04L 29/08* (2006.01)

(52) U.S. Cl.
CPC .............. *H04L 47/25* (2013.01); *H04L 67/06* (2013.01); *H04L 67/10* (2013.01); *H04L 67/1095* (2013.01); *H04L 67/1097* (2013.01); *H04L 67/12* (2013.01); *H04L 67/322* (2013.01); *H04L 67/325* (2013.01)

(58) Field of Classification Search
None
See application file for complete search history.

(56) References Cited

U.S. PATENT DOCUMENTS

| 6,735,541 B2 * | 5/2004 | Kern .................. G05B 23/0221 702/84 |
| 7,007,084 B1 * | 2/2006 | Chakravarti .......... H04L 41/147 709/224 |
| 2001/0056486 A1 * | 12/2001 | Kosaka ................... H04L 43/00 709/224 |
| 2005/0263409 A1 * | 12/2005 | Song ...................... G01N 27/26 205/787 |

(Continued)

FOREIGN PATENT DOCUMENTS

JP 2009-80696 4/2009

*Primary Examiner* — Lonnie V Sweet
(74) *Attorney, Agent, or Firm* — Oblon, McClelland, Maier & Neustadt, L.L.P.

(57) ABSTRACT

Provided is an information processing apparatus that can store necessary data in a data storage unit while effectively preventing information processing resources from being consumed. A data acquisition unit acquires facility data. A data transmission unit transmits the facility data acquired by the data acquisition unit to a data storage unit of a server. A transmission frequency decision unit decides a frequency at which the data transmission unit transmits the facility data to the data storage unit. The transmission frequency decision unit decides the frequency at which the facility data is transmitted to the data storage unit in such a way that the frequency at which the facility data is transmitted when a degradation state of a facility is progressing becomes higher than the frequency at which the operation state data is transmitted when the degradation state of the facility is not progressing.

8 Claims, 14 Drawing Sheets

(56) References Cited

U.S. PATENT DOCUMENTS

| | | | |
|---|---|---|---|
| 2009/0083610 A1 | 3/2009 | Arai et al. | |
| 2011/0141643 A1* | 6/2011 | Hummel | H02H 3/08 |
| | | | 361/93.1 |
| 2016/0363510 A1* | 12/2016 | Kanack | B25B 27/10 |
| 2018/0173188 A1* | 6/2018 | Poletto | B23Q 17/2495 |
| 2018/0361544 A1* | 12/2018 | Heitkamp | B25B 13/06 |

* cited by examiner

| MEAN VALUE: $\mu$ =10.04, STANDARD DEVIATION: $\sigma$ =3.17 ||
|---|---|
| RANGE A (PERIOD:a) | $\mu-\sigma \sim \mu+\sigma$ <br> $\Rightarrow 6.87 \sim 13.23$ |
| RANGE B (PERIOD:b) | $\mu-2\sigma \sim \mu-\sigma$, $\mu+\sigma \sim \mu+2\sigma$ <br> $\Rightarrow 3.69 \sim 6.87$, $13.23 \sim 16.41$ |
| RANGE C (PERIOD:c) | $\mu-3\sigma \sim \mu-2\sigma$, $\mu+2\sigma \sim \mu+3\sigma$ <br> $\Rightarrow 0.51 \sim 3.69$, $16.41 \sim 19.59$ |
| RANGE D (PERIOD:d) | $\mu-4\sigma \sim \mu-3\sigma$, $\mu+3\sigma \sim \mu+4\sigma$ <br> $\Rightarrow 0(-2.67) \sim 0.51$, $19.59 \sim 22.77$ |

Fig. 8

| k | MEAN VALUE $\mu$k | DATA RANGE | STANDBY PERIOD | TRANSMISSION FREQUENCY |
|---|---|---|---|---|
| 2ND | 10.05 | RANGE A | PERIOD a | LOW |
| 100TH | 14.86 | RANGE B | PERIOD b | ↓ |
| 500TH | 17.50 | RANGE C | PERIOD c | ↓ |
| 1000TH | 20.04 | RANGE D | PERIOD d | HIGH |

Fig. 9

INFORMATION PROCESSING APPARATUS, DATA MANAGEMENT SYSTEM, DATA MANAGEMENT METHOD, AND NON-TRANSITORY COMPUTER READABLE MEDIUM STORING PROGRAM

CROSS REFERENCE TO RELATED APPLICATIONS

This application is based upon and claims the benefit of priority from Japanese patent application No. 2018-006577, filed on Jan. 18, 2018, the disclosure of which is incorporated herein in its entirety by reference.

BACKGROUND

The present disclosure relates to an information processing apparatus, a data management system, a data management method, and a program. In particular, the present disclosure relates to an information processing apparatus, a data management system, a data management method, and a program for managing operation state data that indicates an operation state of a facility.

In order to manage a plurality of facilities in a factory, operation state data indicating an operation state of each facility is acquired. In this case, a server such as a cloud provided at a higher level on the facility side may manage the plurality of facilities. The server can acquire the operation state data from the facility side via a network such as the Internet and perform various analyses using the acquired operation state data. That is, the operation state data detected on the facility side is transmitted from the facility side to the server via the network.

In such a technique, it is desired to effectively prevent reduction in the storage capacity of the server and congestion (communication failure) of the network; that is, to effectively prevent information processing resources such as storage resources and network resources from being consumed. In order to effectively prevent the information processing resources from being consumed, the amount of data transmitted from the facility side to the server may be reduced.

Regarding the above technique, Japanese Unexamined Patent Application Publication No. 2009-080696 discloses a storage sub-system that includes a memory device, a memory including a control program, and a controller for controlling write access of a host to the storage device on data or read access on the data based on the control program. In Japanese Unexamined Patent Application Publication No. 2009-080696, the amount of data can be effectively reduced by de-duplication even in a disk array apparatus including a guarantee code. Japanese Unexamined Patent Application Publication No. 2009-080696 discloses generating a guarantee code based on a unique attribute of data, adding the guarantee code to the data, writing the data in a storage device, and checking the guarantee code when the data is read from the storage device to determine whether the data is valid. When there is first data and second data as the data and they have the same contents, the first data is stored in the storage device together with the guarantee code while the second data is not stored in the storage device. On the other hand, when the content of the first data is not the same as that of the second data, the second data is stored in the storage device.

SUMMARY

Regarding the operation state data, the content of the data is often different each time it is detected. An amount of data required for an analysis may vary depending on a degradation state of a facility. In the technique of Japanese Unexamined Patent Application Publication No. 2009-080696, the data is stored in the storage device when the contents of the data are different from each other, which may increase the amount of data to be stored. Therefore, with the technique according to Japanese Unexamined Patent Application Publication No. 2009-080696, it may not be possible to effectively prevent information processing resources from being consumed.

An object of the present disclosure is to provide an information processing apparatus, a data management system, a data management method, and a program that can store necessary data in a data storage unit while effectively preventing information processing resources from being consumed.

An information processing apparatus according to the present disclosure includes: a data acquisition unit configured to acquire facility data indicating information related to a facility; a data transmission unit configured to transmit the facility data acquired by the data acquisition unit to a data storage unit that stores the facility data; and a transmission frequency decision unit configured to decide a frequency at which the data transmission unit transmits the facility data to the data storage unit. The transmission frequency decision unit decides the frequency at which the facility data is transmitted to the data storage unit in such a way that the frequency at which the facility data is transmitted when a degradation state of the facility is progressing becomes higher than the frequency at which the facility data is transmitted when the degradation state of the facility is not progressing.

A data management system according to the present disclosure includes: a data acquisition unit configured to acquire facility data indicating information related to a facility; a data storage unit configured to store the facility data; a data transmission unit configured to transmit the facility data acquired by the data acquisition unit to a data storage unit; and a transmission frequency decision unit configured to decide a frequency at which the data transmission unit transmits the facility data to the data storage unit. The transmission frequency decision unit decides the frequency at which the facility data is transmitted to the data storage unit in such a way that the frequency at which the facility data is transmitted when a degradation state of the facility is progressing becomes higher than the frequency at which the facility data is transmitted when the degradation state of the facility is not progressing.

A data management method according to the present disclosure includes: acquiring facility data indicating information related to a facility; deciding a frequency at which the facility data is transmitted to a data storage unit in such a way that the frequency at which the facility data is transmitted when a degradation state of the facility is progressing becomes higher than the frequency at which the facility data is transmitted to the data storage unit when the degradation state of the facility is not progressing; and transmitting the facility data to the data storage unit at the decided frequency.

A program according to the present disclosure causes a computer to execute: acquiring facility data indicating information related to a facility; deciding a frequency at which the facility data is transmitted to a data storage unit in such a way that the frequency at which the facility data is transmitted when a degradation state of the facility is progressing becomes higher than the frequency at which the facility data is transmitted to the data storage unit when the degradation state of the facility is not progressing; and performing control to transmit the facility data to the data storage unit at the decided frequency.

The above-described configurations according to the present disclosure increases the transmission frequency when the facility is degrading so that a state of the facility can be monitored in detail and reduces the transmission frequency when the facility is not degrading so that information processing resources can be effectively prevented from being consumed. Thus, it is possible to store necessary data in a data storage unit while effectively preventing information processing resources from being consumed.

Preferably, the transmission frequency decision unit increases the frequency at which the facility data is transmitted as a running time of the facility becomes longer, assuming that the degradation state of the facility is progressing.

Such a configuration according to the present disclosure enables a progress of a degradation state to be evaluated by simple processing.

Preferably, the transmission frequency decision unit calculates a reference value of the facility data and increases the frequency at which the facility data is transmitted as a difference between the reference value and a value related to the facility data becomes greater, assuming that the degradation state of the facility is progressing. Such a configuration according to the present disclosure enables the progress of the degradation state to be evaluated more accurately.

Preferably, when the facility is evaluated as abnormal when the value related to the facility data reaches a predetermined threshold, the transmission frequency decision unit increases the frequency at which the facility data is transmitted as the value related to the facility data becomes closer to the threshold, assuming that the degradation state of the facility is progressing. Such a configuration according to the present disclosure enables the progress of the degradation state to be evaluated by simple processing more accurately.

Preferably, the facility data includes quality data used for determining quality of a workpiece processed by the facility and operation state data indicating an operation state of the facility, and the transmission frequency decision unit decides a frequency at which the data transmission unit transmits the operation state data to the data storage unit. Such a configuration according to the present disclosure enables all of the quality data to be transmitted to the data storage unit. This enables quality of products to be more appropriately managed. Further, it is possible to prevent the quality of the product from decreasing even when the transmission frequency of the data is changed.

According to the present disclosure, it is possible to provide an information processing apparatus, a data management system, a data management method, and a program that can store necessary data in a data storage unit while effectively preventing information processing resources from being consumed.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 is a view showing an example of a data range according to the first embodiment;

FIG. 9 is a view showing an example in which the standby periods are decided for data acquired from the second time onward;

DESCRIPTION OF EMBODIMENTS

First Embodiment

Figure 1:
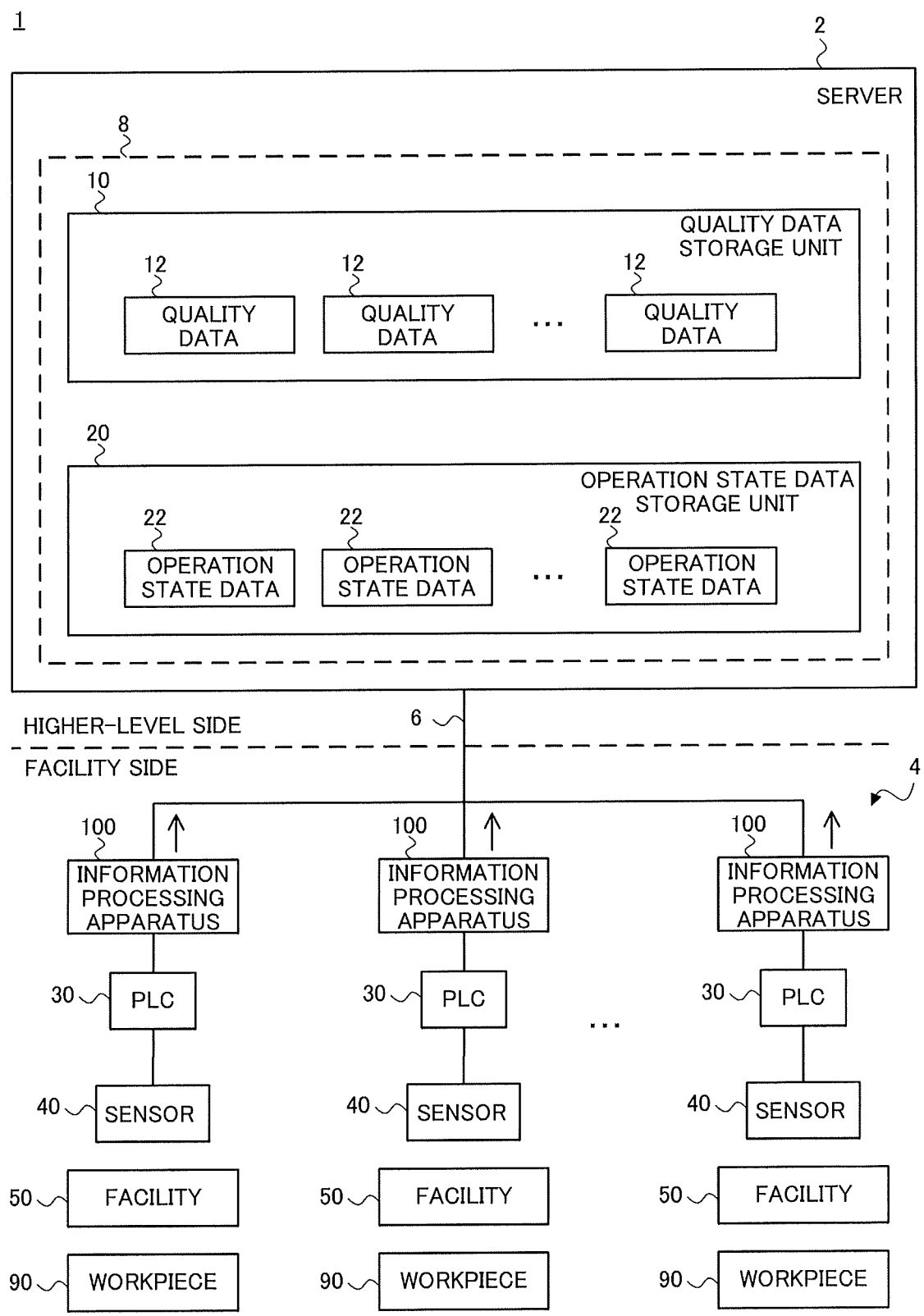
FIG. 1 is a view showing a data management system according to a first embodiment.

Hereinafter, embodiments of the present disclosure will be described with reference to the drawings. Note that substantially the same components are denoted by the same reference numerals.

FIG. 1 is a view showing a data management system 1 according to a first embodiment. The data management system 1 according to the first embodiment includes a server 2 which is a higher-level system and a facility-side system 4 which is a lower-level system. The server 2 and the facility-side system 4 are connected to each other via a network 6 such as the Internet. The server 2 can be achieved by, for example, cloud computing. The server 2 has a function as a computer. The server 2 includes a data storage unit 8 that stores various data pieces acquired from the facility-side system 4.

The facility-side system 4 includes a plurality of facilities 50 that are installed in, for example, a manufacturing factory of products such as vehicles. A facility 50 may be provided for each manufacturing process of the products. Each facility 50 is a device for manufacturing the products. Each facility 50 performs processing (cutting, polishing, painting, assembling, etc.) necessary for each process on a workpiece 90. For example, the facility 50 may be one of various kinds of machine tools, industrial robots, cutting machines such as a lathe, or NC (Numerical Control) machine tools. The facility-side system 4 here may include a plurality of facilities 50 in one factory. Alternatively, the facility-side system 4 may include a plurality of facilities 50 in a plurality of factories.

The facility-side system 4 includes a Programmable Logic Controller (PLC) 30, a sensor 40, and an information processing apparatus 100. The sensor 40 detects a state of each facility 50 or a state of the workpiece 90 processed by each facility 50. That is, the sensor 40 measures a physical quantity indicating the state of each facility 50 or the state of the workpiece 90. The PLC 30 controls an operation of each facility 50. When the facility 50 is an industrial robot, the PLC 30 may be incorporated into the facility 50. The PLC 30 acquires facility data indicating such a state detected by the sensor 40.

The facility data here indicating the state of the workpiece 90 is referred to as quality data 12. The facility data indicating the operation state such as a running state of the facility 50 is referred to as operation state data 22. The quality data 12 is used to determine the quality of the product (the workpiece 90). The operation state data 22 is used for maintenance of the facility 50. The operation state data 22 is, for example, maintenance data. The operation state data 22 may be used, for example, to determine a sign of an abnormality in the corresponding facility 50. The operation state data 22 is measurement data of parameters indicating the operation state of each facility 50. The operation state data 22 indicates, for example, a vibration, a temperature, a pressure, a flow rate, a rotational speed, a current value, a position, and a speed. The quality data 12 is measurement data in each process of the workpiece 90 (the product). The quality data 12 indicates, for example, a size, a pressure, and a rotational speed.

The information processing apparatus 100 is, for example, a computer. The information processing apparatus 100 has a function as an edge device for the server 2 which is a cloud. That is, the information processing apparatus 100 and the server 2 constitute a cloud/edge system and can perform a cloud/edge analysis. The information processing apparatus 100 transmits the facility data acquired by the PLC 30 to the server 2.

The server 2 (cloud) has a function as a platform for aggregating information about each facility 50 (the facility data) and managing and analyzing the aggregated data. In this case, the server 2 may be a cloud inside the factory (a platform inside the factory) which manages the facilities 50 in one factory or may be an inter-factory cloud (a platform between factories) which manages the facilities 50 across a plurality of factories. The server 2 can monitor the behavior and degradation states of the facilities 50 using the facility data.

The server 2 performs sign management on, for example, abnormalities in the facility 50 using the operation state data 22. The sign management indicates that a sign of an abnormality is determined for each facility 50 from a change in the operation state data 22 and transmits a notification about an abnormality sign when there is a sign of an abnormality in a certain facility 50. A method of determining that there is a sign of an abnormality in a certain facility 50 is, for example, determining whether a value of the operation state data 22 of this facility 50 has reached a predetermined threshold (or exceeded the threshold). The server 2 can decide an algorithm of such abnormality sign management using the operation state data 22 of the plurality of facilities 50 of the same model. For example, the server 2 may decide a threshold serving as a reference for determining the abnormality sign using the operation state data 22.

On the other hand, the information processing apparatus 100 (the edge device) performs a necessary analysis and control on the operation state data 22 related to the corresponding facility 50 in real time. For example, when the operation state data 22 related to one facility 50 indicates an abnormal value, the information processing apparatus 100 can perform control to stop this facility 50.

Note that the PLC 30 (or the information processing apparatus 100) may create one data file, for example, for each cycle of the processing of each facility 50. Then, the information processing apparatus 100 may transmit the one data file to the server 2. Note that the separate data file may be prepared for each of the quality data 12 and the operation state data 22, or one data file may include the quality data 12 and the operation state data 22. The sensor 40 may generate the quality data 12 and the operation state data 22, for example, every several milliseconds. On the other hand, the data file includes the facility data in, for example, one cycle of a few minutes. In other words, the data file is a group of data pieces collected every cycle, that is, at predetermined intervals.

In this embodiment, the information processing apparatus 100 does not transmit all of at least the operation state data 22 of the facility data to the server 2. The information processing apparatus 100 decides at least a transmission frequency of the operation state data 22 according to the degradation state of the facility 50. On the other hand, the information processing apparatus 100 can transmit all of the quality data 12 to the server 2. In this way, the server 2 can more appropriately manage the quality of the products. Thus, it is possible to effectively prevent product quality from decreasing accordingly.

The data storage unit 8 of the server 2 includes a quality data storage unit 10 and an operation state data storage unit 20. The quality data storage unit 10 stores a plurality of pieces of the quality data 12 transmitted from a plurality of information processing apparatuses 100. The operation state data storage unit 20 stores a plurality of pieces of the operation state data 22 transmitted from the plurality of information processing apparatuses 100. That is, the data storage unit 8 stores the facility data. In other words, the server 2 has a function as a data storage unit for storing the facility data.

Figure 2:
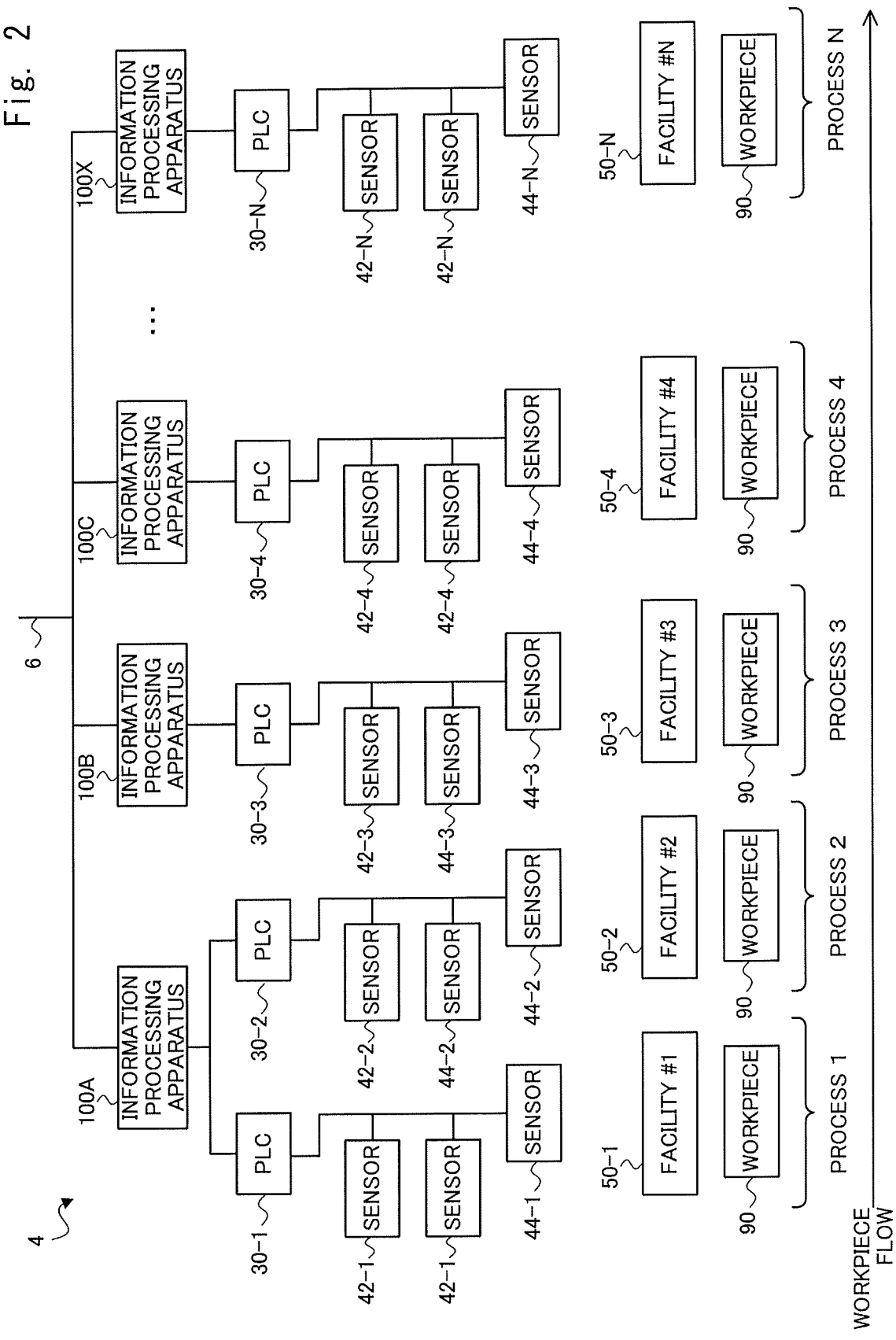
FIG. 2 is a view showing a configuration of a facility-side system according to the first embodiment.

FIG. 2 is a view showing a configuration of the facility-side system 4 according to the first embodiment. The facility-side system 4 includes a plurality of facilities 50-1, 50-2, 50-3, 50-4, . . . , and 50-N. Here, N is an integer of 2 or greater. Each of the facilities 50-1, 50-2, 50-3, 50-4, . . . , and 50-N can process the workpiece 90 in processes 1, 2, 3, 4, . . . , N, respectively. The workpiece 90 (the product) can move from the process 1 to the process N. Further, the facility-side system 4 includes a plurality of information processing apparatuses 100A, 100B, 100C, . . . , and 100X. Note that the number of the information processing apparatuses 100 may be any number irrespective of the number of processes and facilities 50.

The sensor 40 shown in FIG. 1 includes a quality data collection sensor 42 and an operation state detection sensor 44. In each process, the quality data collection sensor 42 detects a state related to the quality of the workpiece 90 and generates the quality data 12. The operation state detection sensor 44 detects the operation state of the facility 50 in each process and generates the operation state data 22.

The facility-side system 4 includes the PLC 30, the quality data collection sensor 42, and the operation state detection sensor 44 corresponding to each facility 50 (each process). For the process 1 (the facility 50-1), one PLC 30-1, one or more quality data collection sensors 42-1, and one or more operation state detection sensors 44-1 are provided. Likewise, for the process 2 (the facility 50-2), one PLC 30-2, one or more quality data collection sensors 42-2, and one or more operation state detection sensors 44-2 are provided. For the process 3 (the facility 50-3), one PLC 30-3, one or more quality data collection sensors 42-3, and one or more operation state detection sensors 44-3 are provided. For the process 4 (the facility 50-4), one PLC 30-4, one or more quality data collection sensors 42-4, and one or more operation state detection sensors 44-4 are provided. For the process N (the facility 50-N), one PLC 30-N, one or more quality data collection sensors 42-N, and one or more operation state detection sensors 44-N are provided. Further, the information processing apparatus 100A performs information processing on the process 1 and the process 2 (the facility 50-1 and the facility 50-2). The information processing apparatus 100B performs information processing on the process 3 (the facility 50-3). The information processing apparatus 100C performs information processing on the process 4 (the facility 50-4). The information processing apparatus 100X performs information processing on the process N (the facility 50-N).

Figure 3:
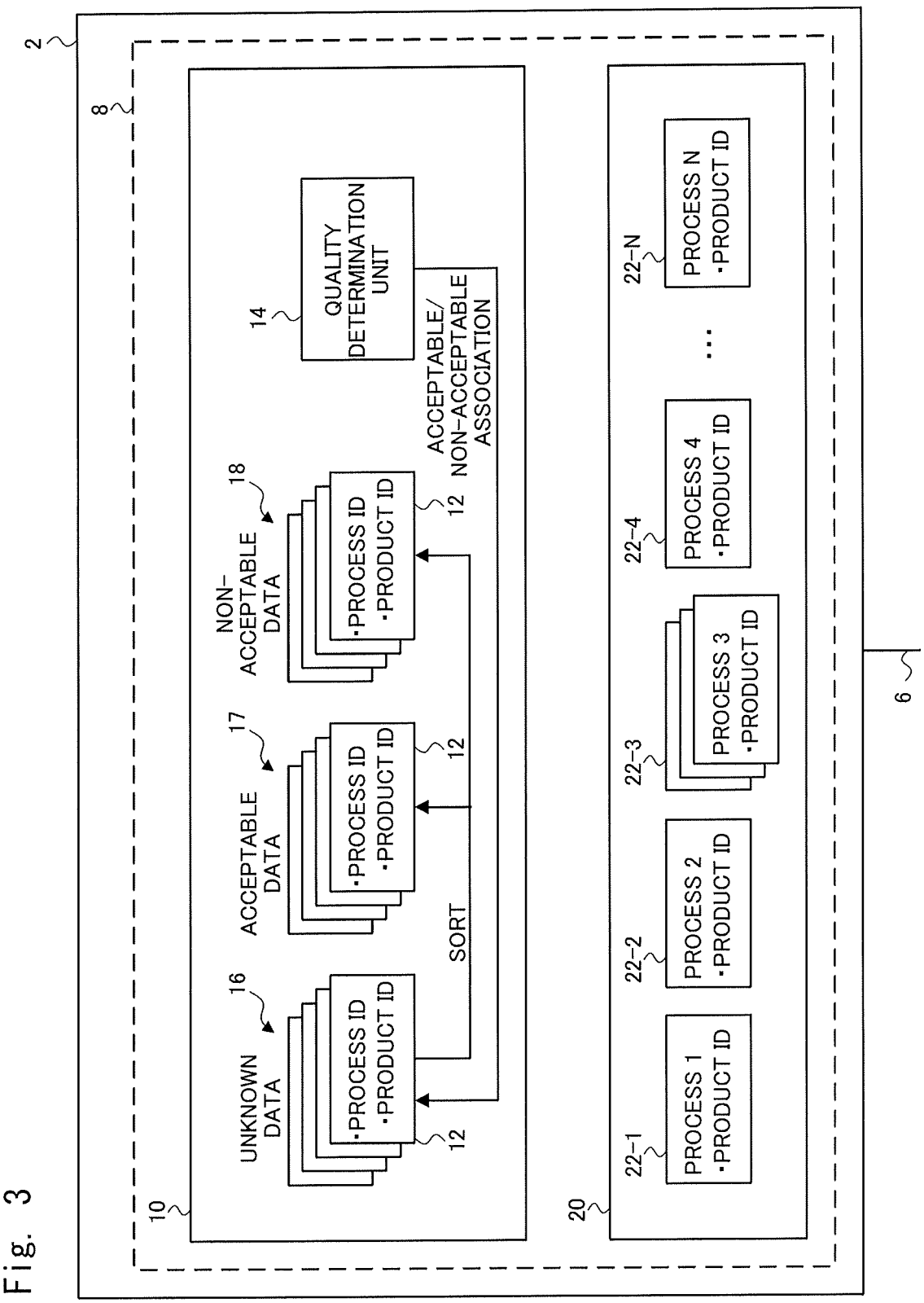
FIG. 3 is a view showing a server according to the first embodiment.

FIG. 3 is a view showing the server 2 (the higher-level device) according to the first embodiment. As described above, the server 2 includes the data storage unit 8. The data storage unit 8 includes the quality data storage unit 10 and the operation state data storage unit 20. The quality data storage unit 10 includes a quality determination unit 14, an unknown quality data storage unit 16, an acceptable quality data storage unit 17, and a non-acceptable quality data storage unit 18. Each piece of the quality data 12 includes identification information indicating each process and a product ID (identification) which is identification information of the product. The unknown quality data storage unit 16 stores the quality data 12 of the product having quality that is unknown whether it is acceptable or non-acceptable. The acceptable quality data storage unit 17 stores the quality data 12 of the product which has been determined that the product has acceptable quality. The non-acceptable quality data storage unit 18 stores the quality data 12 of the product determined that the product has non-acceptable quality. The quality data 12 transmitted from the information processing apparatus 100 is first stored in the unknown quality data storage unit 16.

The quality determination unit 14 analyzes the quality data 12 stored in the unknown quality data storage unit 16 for a certain process to determine whether the quality of the corresponding workpiece 90 (the product) is acceptable or non-acceptable. For example, the quality determination unit 14 determines whether a value of the quality data 12 satisfies a predetermined reference. Specifically, the quality determination unit 14 may determine whether the value of the quality data 12 is within a tolerance. The quality determination unit 14 associates the quality data 12 which is determined that the product has acceptable quality with the fact that the product has acceptable quality. Then, the quality determination unit 14 stores the quality data 12 associated with the fact that the quality is acceptable in the acceptable quality data storage unit 17. On the other hand, the quality determination unit 14 associates the quality data 12 which is determined that the product has non-acceptable quality with the fact that the product has non-acceptable quality. Then, the quality determination unit 14 stores the quality data 12 associated with the fact that corresponding workpiece 90 has non-acceptable quality in the non-acceptable quality data storage unit 18.

The unknown quality data storage unit 16 saves the quality data 12 for a period until acceptable or non-acceptable quality is associated with the quality data 12. The acceptable quality data storage unit 17 does not need to save all of the quality data 12 that is determined that the products are acceptable in quality, and instead may save only the representative quality data 12 for each facility change or material lot. On the other hand, it is preferable that the non-acceptable quality data storage unit 18 save all of the quality data 12 determined that the products are non-acceptable in quality for product quality management.

Each piece of the operation state data 22 includes identification information indicating each process and a product ID which is identification information of the product. The operation state data 22 (22-1, 22-2, 22-3, 22-4, . . . , and 22-N) may be saved, for example, for each process (for each process 1, 2, 3, 4, . . . , and N). The server 2 uses the operation state data 22 to monitor the state of the facility 50. Specifically, the server 2 monitors a sign of an abnormality in the facility 50 using the operation state data 22. The accuracy of the determination of the abnormality sign here needs to be increased as the time approaches to a point where an abnormality occurs. Therefore, in this embodiment, the closer the time is to the point where an abnormality occurs, the greater the amount of the operation state data 22 are stored in the data storage unit 8 of the server 2 (the operation state data storage unit 20).

To be more specific, in this embodiment, a saving cycle of the operation state data 22 differs according to the degradation state of the corresponding facility 50. That is, as the degradation state of the facility 50 progresses, the saving cycle of the operation state data 22 becomes shorter. In other words, as the degradation state of the facility 50 progresses, the amount of the operation state data 22 saved increases. By doing so, when the degradation of the facility 50 progresses, the server 2 can monitor the behavior of the facility 50 in more detail.

Figure 4:
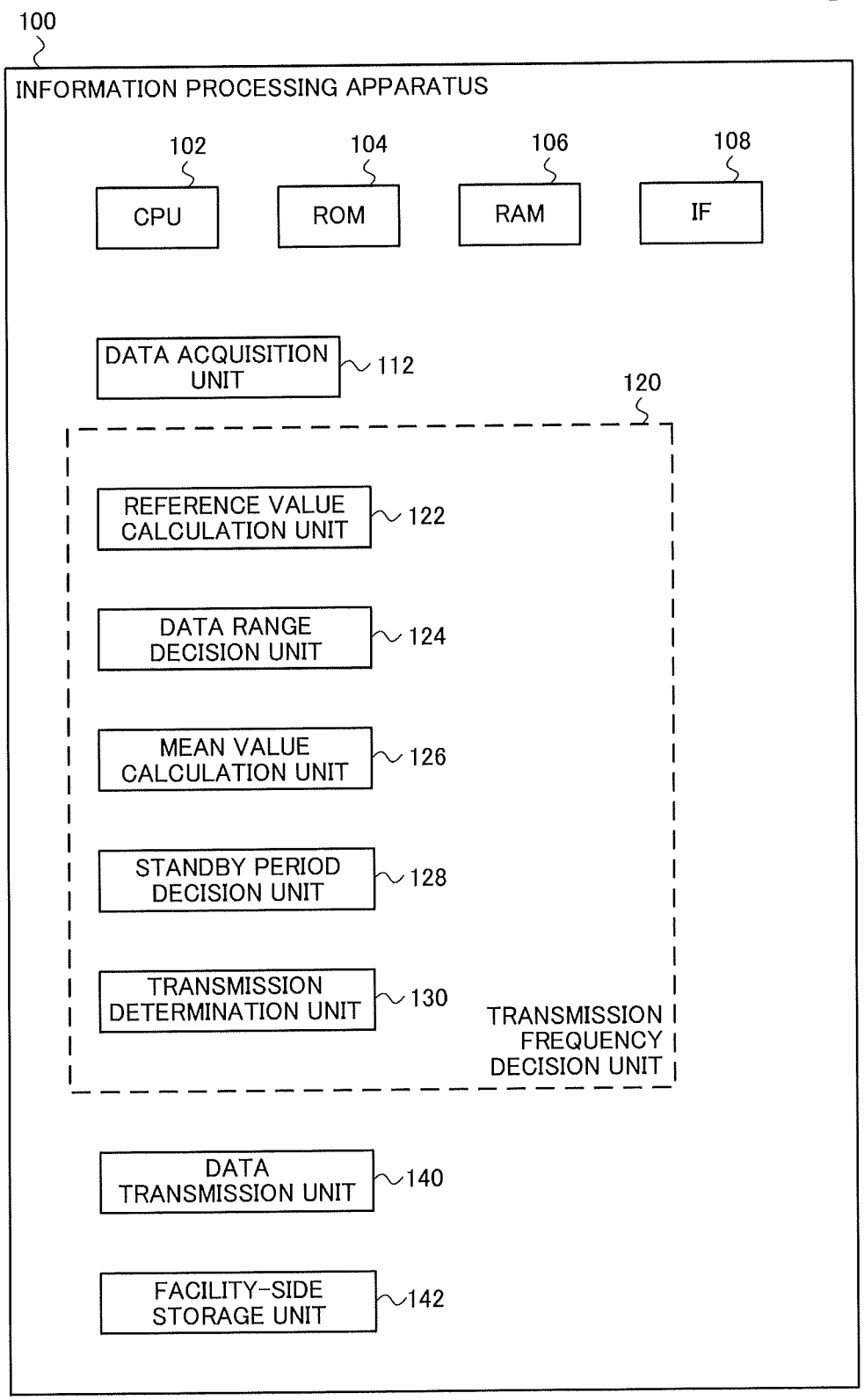
FIG. 4 is a view showing a configuration of an information processing apparatus according to the first embodiment.

FIG. 4 is a view showing a configuration of the information processing apparatus 100 according to the first embodiment. The information processing apparatus 100 is, for example, a computer. The information processing apparatus 100 includes a CPU (Central Processing Unit) 102, a ROM (Read Only Memory) 104, a RAM (Random Access Memory) 106, and an interface unit 108 (IF; Interface) as a main hardware configuration. The CPU 102, the ROM 104, the RAM 106, and the interface unit 108 are connected to one another via a data bus or the like.

The CPU 102 has a function as an arithmetic apparatus that performs control processing, arithmetic processing, and the like. The ROM 104 has a function of storing a control program and an arithmetic program etc. to be executed by the CPU 102. The RAM 106 has a function of temporarily storing processing data and the like. The interface unit 108 inputs and outputs signals to and from the outside in a wired or wireless manner. The interface unit 108 may include a communication port. Note that the interface unit 108 may include a display. The server 2 may also include a CPU, a ROM, a RAM, and an interface unit.

Further, the information processing apparatus 100 includes a data acquisition unit 112, a transmission frequency decision unit 120, a data transmission unit 140, and a facility-side storage unit 142. The transmission frequency decision unit 120 includes a reference value calculation unit 122, a data range decision unit 124, a mean value calculation unit 126, a standby period decision unit 128, and a transmission determination unit 130. The data acquisition unit 112, the transmission frequency decision unit 120, the data transmission unit 140, and the facility-side storage unit 142 can be achieved, for example, by the CPU 102 executing a program stored in the ROM 104. Alternatively, the data acquisition unit 112, the transmission frequency decision unit 120, the data transmission unit 140, and the facility-side storage unit 142 may be achieved by installing a necessary program recorded on any non-volatile recording medium as necessary. Note that this also applies to embodiments other than this embodiment, which will be described later.

The data acquisition unit 112, the transmission frequency decision unit 120, the data transmission unit 140, and the facility-side storage unit 142 are not limited to being achieved by software as described above, and instead may be achieved by hardware such as some kind of a circuit element. Further, the data acquisition unit 112, the transmission frequency decision unit 120, the data transmission unit 140, and the facility-side storage unit 142 do not need to be physically provided in one apparatus, and instead may be configured as hardware separate from one another. In such a case, each of the data acquisition unit 112, the transmission frequency decision unit 120, the data transmission unit 140, and the facility-side storage unit 142 may function as a computer.

The data acquisition unit 112 acquires the facility data (the quality data 12 and the operation state data 22) from the sensor 40 via the PLC 30. The data transmission unit 140 transmits the facility data acquired by the data acquisition unit 112 to the data storage unit 8 of the server 2. The transmission frequency decision unit 120 decides a frequency at which the data transmission unit 140 transmits the operation state data 22 of the facility data to the data storage unit 8 (the server 2). That is, the data transmission unit 140 does not transmit all of the operation state data 22. The facility-side storage unit 142 stores the operation state data 22 not transmitted by the data transmission unit 140. In other words, the operation state data 22 not transmitted to the data storage unit 8 (the server 2) may be saved in the facility-side system 4.

Here, the transmission frequency decision unit 120 decides the frequency at which the operation state data 22 is transmitted to the data storage unit 8 in such a way that the transmission frequency of the operation state data 22 when the degradation state of the facility 50 is progressing will become higher than that of the operation state data 22 when the degradation state of the facility 50 is not progressing. Then, the transmission frequency decision unit 120 calculates the reference value of the operation state data 22, and decides the transmission frequency of the operation state data 22 in such a way that the greater the difference between the reference value and a value related to the operation state data 22, the higher the transmission frequency of the operation state data 22 becomes, assuming the degradation state of the facility 50 is progressing. Details will be described later.

Figure 5:
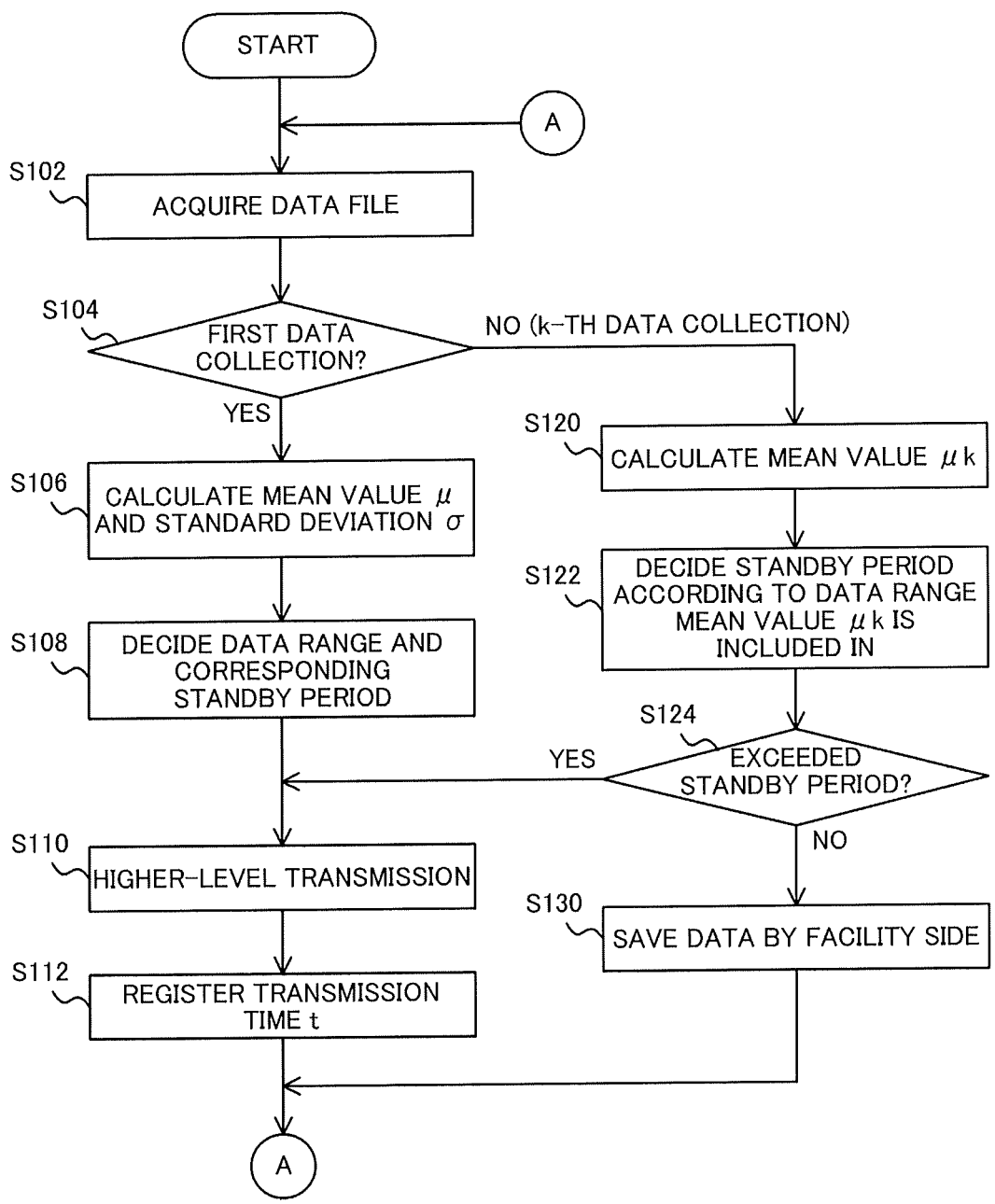
FIG. 5 is a flowchart showing a data management method performed by the information processing apparatus according to the first embodiment.

FIG. 5 is a flowchart showing a data management method performed in the information processing apparatus 100 according to the first embodiment. The processing shown in FIG. 5 is performed for each parameter (the physical quantity) indicated by certain operation state data 22 of the facility 50 related to each information processing apparatus 100. For example, when two pieces of vibration data are detected by the operation state detection sensor 44-3 for the facility 50-3, the processing shown in FIG. 5 is performed for each piece of the vibration data of the facility 50-3.

Firstly, the data acquisition unit 112 of the information processing apparatus 100 acquires the data file including the operation state data 22 from the PLC 30 (Step S102). Next, the transmission frequency decision unit 120 of the information processing apparatus 100 evaluates whether the processing of S102 is first data collection (Step S104). The "first data collection" here indicates that the facility 50 to be processed is introduced into a factory, and the data file is transmitted in a first cycle. It is assumed that the influence of the initial failure has been eliminated in the "first data collection".

When the processing of S102 is the first data collection (YES in S104), the reference value calculation unit 122 of the transmission frequency decision unit 120 calculates a mean value $\mu$ and a standard deviation $\sigma$ of the values of the plurality of pieces of the operation state data 22 constituting the data file of the first cycle (Step S106). The mean value $\mu$ here corresponds to the reference value. Next, the data range decision unit 124 of the transmission frequency decision unit 120 decides a plurality of data ranges as a reference of the transmission frequency of the operation state data 22 and a standby period corresponding to each data range (Step S108). The standby period here is a period during which the operation state data 22 is not transmitted to the server 2 and waited to be transmitted. The data range will be described with reference to FIG. 6.

Figure 6:
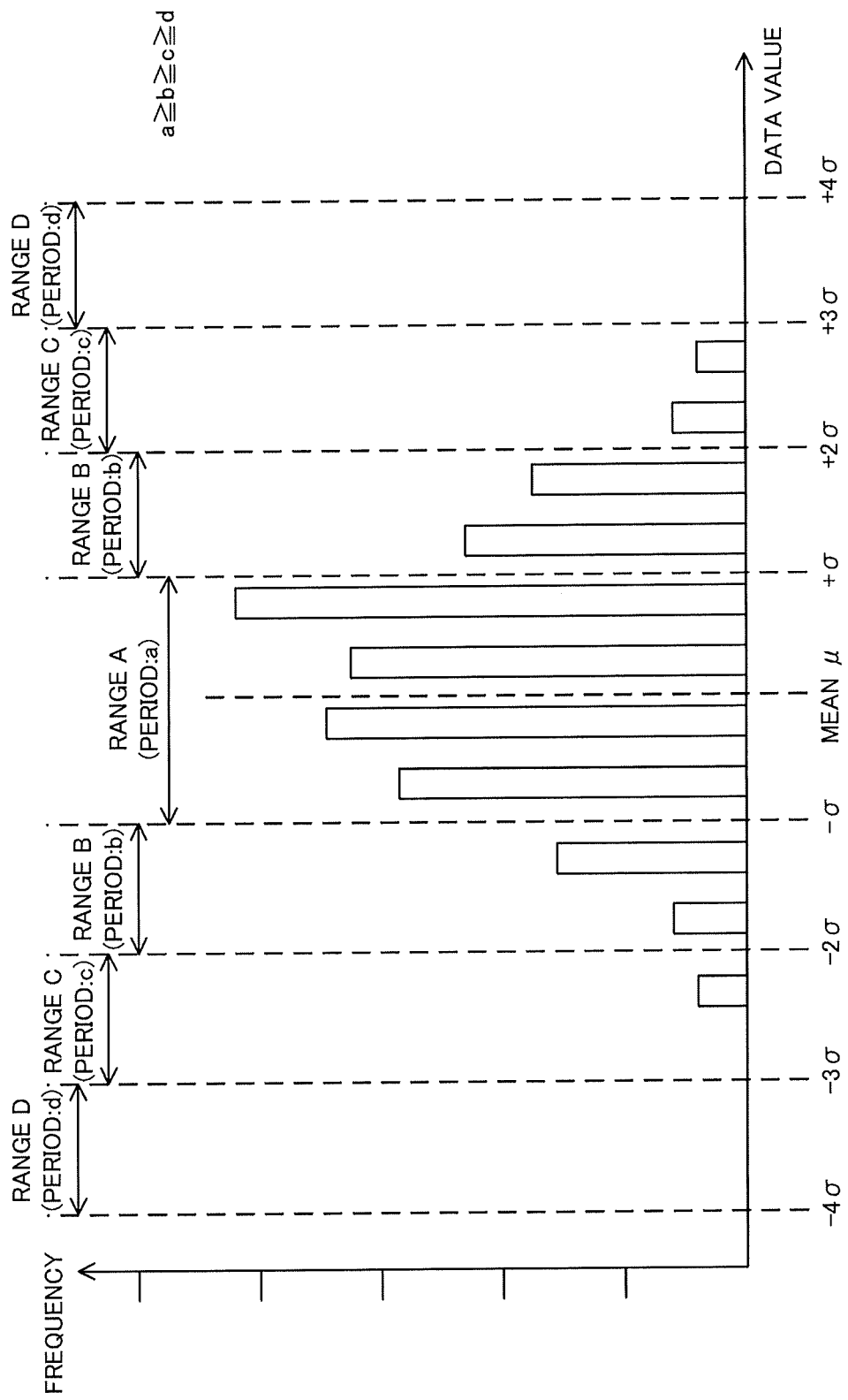
FIG. 6 is a view for describing a data range and a standby period according to the first embodiment.

FIG. 6 is a view for describing the data range and the standby period according to the first embodiment. FIG. 6 shows a histogram of the operation state data 22 in the first data file in association with the data range. In FIG. 6, the horizontal axis represents a data value of the operation state data 22, and the vertical axis represents the number of data pieces (frequency) in each section of the data value. As shown in FIG. 6, commonly, the closer the data value is to the mean value $\mu$, the greater the number of data pieces tends to become.

Here, the data range decision unit 124 decides the range of $\pm\sigma$ from the mean value $\mu$ ($\mu-\sigma$ to $\mu+\sigma$; $\mu-\sigma$ or greater and $\mu+\sigma$ or less) as a data range A. Then, the data range decision unit 124 associates the data range A with a standby period a. Further, the data range decision unit 124 decides the range outside the range from the mean value to $\pm\sigma$ within the range of $\pm 2\sigma$ from the mean value $\mu$ ($\mu-2\sigma$ to $\mu-\sigma$, $\mu+\sigma$ to $\mu+2\sigma$; $\mu-2\sigma$ or greater and less than $\mu-\sigma$, greater than $\mu+\sigma$ and $\mu+2\sigma$ or less) as a data range B. Then, the data range decision unit 124 associates the data range B with a standby period b. Furthermore, the data range decision unit 124 decides the range outside the range of $\pm 2\sigma$ from the mean value $\mu$ within the range of $\pm 3\sigma$ from the mean value $\mu$ ($\mu-3\sigma$ to $\mu-2\sigma$, $\mu+2\sigma$ to $\mu+3\sigma$; $\mu-3\sigma$ or greater and less than $\mu-2\sigma$, more than $\mu+2\sigma$ and $\mu+3\sigma$ or less) as a data range C. Then, the data range decision unit 124 associates the data range C with a standby period c. In addition, the data range decision unit 124 decides a range outside the range of $\pm 3\sigma$ from the mean value $\mu$ within the range of $\pm 4\sigma$ from the mean value $\mu$ ($\mu-4\sigma$ to $\mu-3\sigma$, $\mu+3\sigma$ to $\mu+4\sigma$; $\mu-4\sigma$ or greater and less than $\mu+3\sigma$ more than $\mu+3\sigma$ and $\mu+4\sigma$ or less) as a data range D. Then, the data range decision unit 124 associates the data range D with a standby period d. Here, the farther the data range is away from the mean value $\mu$, the shorter the length of the corresponding standby period. That is, a≥b≥c≥d. For example, a may be a few months, b may be a few weeks, c may be a few days, and d may be a few hours.

Then, the data transmission unit 140 transmits the data file of the operation state data 22 to the server 2 (Step S110). Specifically, the data transmission unit 140 controls the interface unit 108 to transmit the data file of the operation state data 22 to the data storage unit 8 of the server 2. Then, the information processing apparatus 100 registers a time t at which the data file of the operation state data 22 is transmitted (Step S112).

When the data acquisition unit 112 acquires the data file of the k-th (k>2) cycle (NO in S102 and S104), the mean value calculation unit 126 calculates a mean value $\mu k$ of the operation state data 22 of the k-th data file (Step S120). The standby period decision unit 128 decides the standby period for the k-th data file according to which data range out of the data ranges decided in the processing of S108 the mean value μk is included in (Step S122). Details will be described later.

Next, the transmission determination unit 130 of the information processing apparatus 100 determines whether the time since the previous higher-level transmission (S110) exceeds the standby period decided in the processing of S122 (Step S124). Specifically, the transmission determination unit 130 determines whether the time since the previous higher-level transmission time t to the present has exceeded the decided standby period. When the standby period has not been exceeded (NO in S124), the transmission determination unit 130 determines not to transmit the data file to the server 2. In such a case, the facility-side storage unit 142 of the information processing apparatus 100 stores the data file. That is, the data is saved in the facility-side system 4 (Step S130). On the other hand, when the time since the time t to the present has exceeded the standby period (YES in S124), the transmission determination unit 130 determines to transmit the data file to the server 2. In such a case, the data transmission unit 140 transmits the data file to the server 2 (S110), and the transmission time t is registered (S112). Details will be described later.

Figure 7:
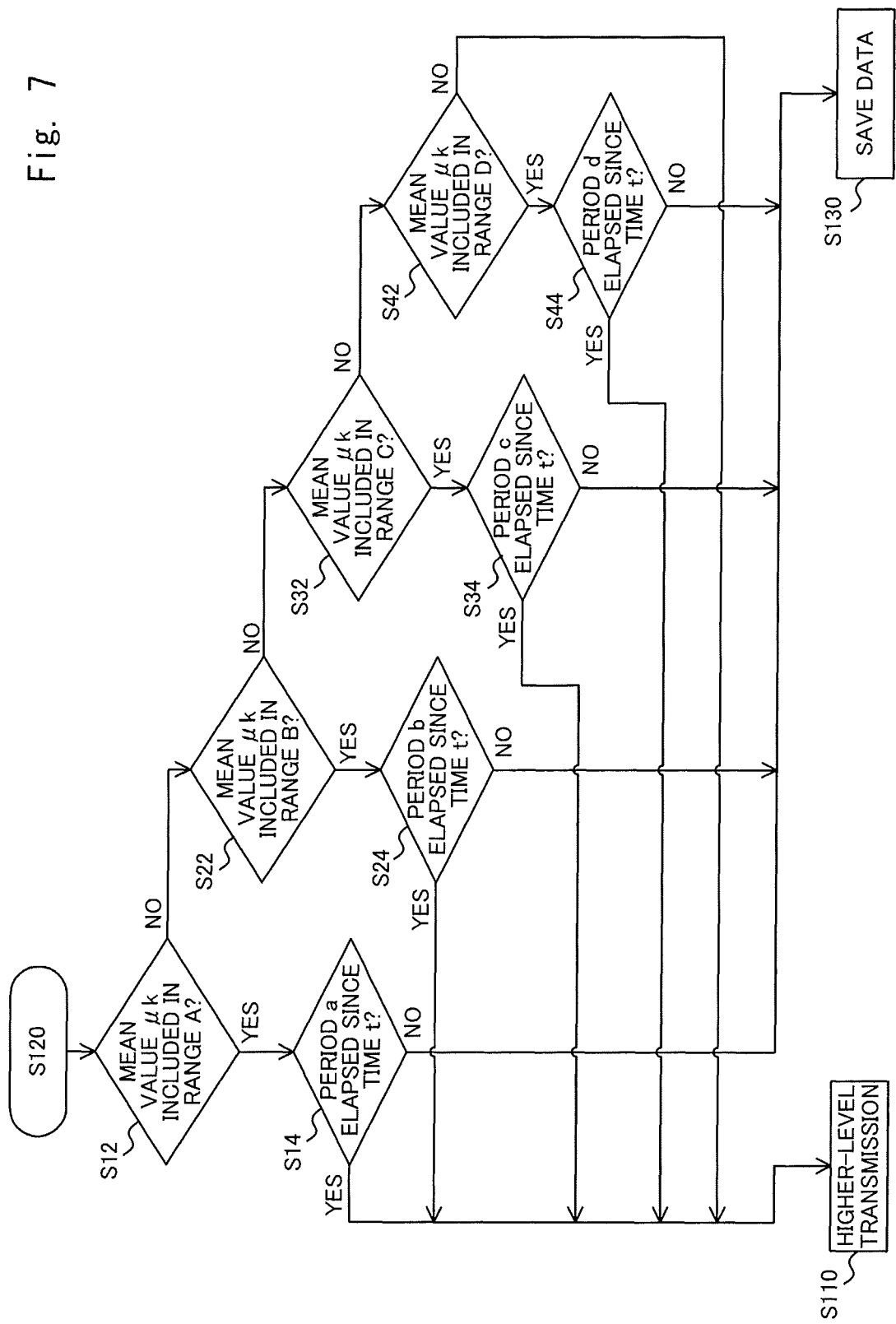
FIG. 7 is a flowchart showing details of the processing in S122 and S124 in FIG. 5.

FIG. 7 is a flowchart showing details of the processing of S122 and S124 in FIG. 5. FIG. 7 shows an example in which the data ranges shown in FIG. 6 are decided in the processing of S108 The standby period decision unit 128 determines whether the mean value μk is included in the data range A (Step S12). When the mean value μk is included in the data range A (YES in S12), the standby period decision unit 128 decides the standby period for the k-th data file as a period a. Then, the transmission determination unit 130 determines whether the period a has elapsed since the higher-level transmission time t (Step S14). When the period a has not elapsed since the higher-level transmission time t (NO in S14), the transmission determination unit 130 determines not to perform the higher-level transmission, and the facility-side storage unit 142 stores the k-th data file (S130). On the other hand, when the period a has elapsed since the higher-level transmission time t (YES in S14), the transmission determination unit 130 determines to perform the higher-level transmission, and the data transmission unit 140 transmits the k-th data file to the server 2 (S110).

Further, when the mean value μk is not included in the data range A (NO in S12), the standby period decision unit 128 determines whether the mean value μk is included in the data range B (Step S22). When the mean value μk is included in the data range B (YES in S22), the standby period decision unit 128 determines the standby period for the k-th data file as a period b. Then, the transmission determination unit 130 determines whether the period b has elapsed since the higher-level transmission time t (Step S24). When the period b has not elapsed since the higher-level transmission time t (NO in S24), the transmission determination unit 130 determines not to perform the higher-level transmission, and the facility-side storage unit 142 stores the k-th data file (S130). On the other hand, when the period b has elapsed since the higher-level transmission time t (YES in S24), the transmission determination unit 130 determines to perform the higher-level transmission, and the data transmission unit 140 transmits the k-th data file to the server 2 (S110).

Further, when the mean value μk is not included in the data range B (NO in S22), the standby period decision unit 128 determines whether the mean value μk is included in the data range C (Step S32). When the mean value μk is included in the data range C (YES in S32), the standby period decision unit 128 decision the standby period for the k-th data file as a period c. Then, the transmission determination unit 130 determines whether the period c has elapsed since the higher-level transmission time t (Step S34). When the period c has not elapsed since the higher-level transmission time t (NO in S34), the transmission determination unit 130 determines not to perform the higher-level transmission, and the facility-side storage unit 142 stores the k-th data file (S130). On the other hand, when the period c has elapsed from the higher-level transmission time t (YES in S34), the transmission determination unit 130 determines to perform the higher-level transmission, and the data transmission unit 140 transmits the k-th data file to the server 2 (S110).

Further, when the mean value μk is not included in the data range C (NO in S32), the standby period decision unit 128 determines whether or not the mean value μk is included in the data range D (Step S42). When the mean value μk is included in the data range D (YES in S42), the standby period decision unit 128 decides the standby period for the k-th data file as a period d. Then, the transmission determination unit 130 determines whether the period d has elapsed since the higher-level transmission time t (Step S44). When the period d has not elapsed since the higher-level transmission time t (NO in S44), the transmission determination unit 130 determines not to perform the higher-level transmission, and the facility-side storage unit 142 stores the k-th data file (S130). On the other hand, when the period c has since from the higher-level transmission time t (YES in S44), the transmission determination unit 130 determines to perform the higher-level transmission, and the data transmission unit 140 transmits the k-th data file to the server 2 (S110).

Further, when the mean value μk is not included in the data range D (NO in S42), the transmission determination unit 130 may determine to perform the higher-level transmission. Then, the data transmission unit 140 may transmit the k-th data file to the server 2 (S110). That is, when the mean value μk is not included in the data range D, the data transmission unit 140 may transmit all the data files, assuming that degradation of the facility 50 has considerably progressed.

Hereinafter, an example using specific numerical values will be described with reference to FIGS. 8 and 9.

FIG. 8 is a view showing an example of a data range according to the first embodiment. The mean value μ of the operation state data 22 of the first data file is 10.04, and the standard deviation σ is 3.17. At this time, the data range A is 6.87 to 13.23. The data range B is 3.69 to 6.87 and 13.23 to 16.41. The data range C is 0.51 to 3.69 and 16.41 to 19.59. The data range D is 0 to 0.51 and 19.59 to 22.77.

FIG. 9 is a view showing an example in which the standby periods are decided for the data acquired from the second time onward. The mean value μk of the operation state data 22 of the second data file (k=2) is 10.05. In the example shown in FIG. 8, this mean value μk=10.05 is included in the data range A. Thus, the standby period for the second data file is the period a. The mean value μk of the operation state data 22 of the 100th data file (k=100) is 14.86. In the example shown in FIG. 8, this mean value μk=14.86 is included in the data range B. Thus, the standby period for the 100th data file is the period b. The mean value μk of the operation state data 22 of the 500th data file (k=500) is 17.50. In the example shown in FIG. 8, this mean value μk=17.50 is included in the data range C. Thus, the standby period for the 500th data file is the period c. The mean value μk of the operation state data 22 of the 1000th data file (k=1000) is 20.04. In the example shown in FIG. 8, this mean value μk=20.04 is included in the data range D. Thus, the standby period for the 1000th data file is the period d.

In this way, as k increases, i.e., as the running time elapses, a difference between the mean value μ (a reference mean value μ) in the first data file, which is the reference value, and the mean value μk in the k-th data file becomes larger. In the first data file, degradation is considered to have progressed the least. Therefore, an increase in the difference between the reference value and the mean value μk indicates that the degradation is progressing. The information processing apparatus according to the first embodiment is configured in such a way that the transmission frequency at which the data file composed of the operation state data 22 is transmitted to the server 2 increases as the difference between the reference value and the value related to the operation state data 22 (the mean value μk) increases, assuming that the degradation is progressing.

Figure 10:
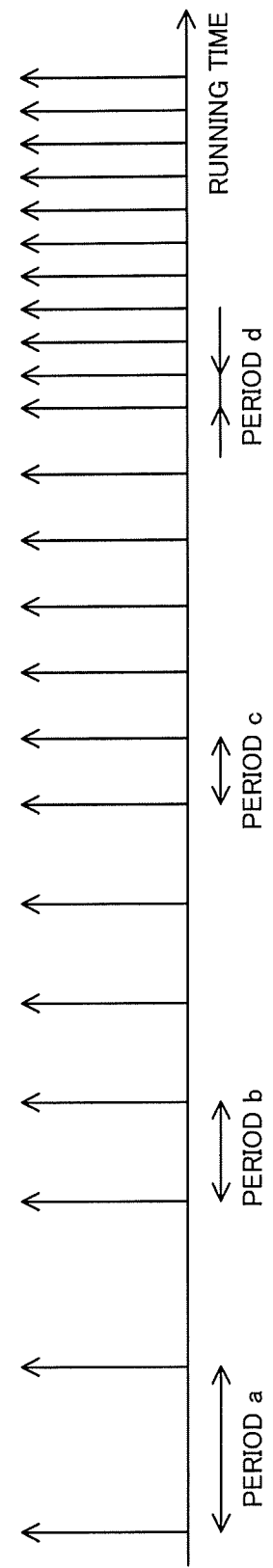
FIG. 10 is a view showing that a transmission frequency of a data file increases as time elapses.

FIG. 10 is a view showing that the transmission frequency of the data file increases over time. The lateral direction indicates the lapse of the running time of the facility 50. The upward arrows indicate that the operation state data 22 is transmitted to the server 2. As the difference between the reference mean value μ and the mean value μk is not large for a while after the facility 50 starts to operate, the transmission interval of the data file is the period a. That is, the transmission frequency is low. On the other hand, since the difference between the reference mean value μ and the mean value μk increases as the running time elapses, the transmission interval of the data file is changed to the period b, i.e., the transmission frequency increases. As the running time further elapses, the difference between the reference mean value μ and the mean value μk becomes large, and the transmission interval of the data file is changed to the period c, i.e., the transmission frequency increases. When the running time further elapses, the difference between the reference mean value μ and the mean value μk becomes large, and the transmission interval of the data file is changed to the period d, i.e., the transmission frequency further increases.

As described above, the information processing apparatus 100 according to the first embodiment decides the transmission frequency in such a way that the transmission frequency of the operation state data 22 (the facility data) when the degradation state of the facility 50 is progressing becomes higher than the transmission frequency of the operation state data 22 when the degradation state of the facility 50 is not progressing. By doing so, the transmission of the operation state data 22 is thinned out, i.e., there is operation state data 22 not transmitted to the server 2. This effectively prevents the information processing resources such as storage resources and network resources of the server 2 from being consumed. Moreover, when the server 2 analyzes an abnormality sign, an abnormality sign can be more accurately determined using a greater amount of the operation state data 22 when the degradation has progressed.

Therefore, a great amount of the operation state data 22 when degradation has progressed is necessary. In other words, not a great amount of the operation state data 22 when degradation is not progressing is needed. For these reasons, the information processing apparatus 100 according to the first embodiment can store necessary data in the server 2 (the data storage unit 8) while effectively preventing the information processing resources from being consumed. In this manner, when degradation of the facility 50 progresses, the server 2 can monitor the behavior of the facility in more detail.

Further, the information processing apparatus 100 according to the first embodiment evaluates the progress of the degradation state using the difference between the reference value (the reference mean value μ), which is the mean value μ in the first data file, and the mean value μk of the operation state data 22 in the data files from the second data file onward. This enables the progress of the degradation state to be determined more accurately.

Note that the transmission frequency of the operation state data 22 changes according to the degradation state of the facility 50, whereas the quality data 12 is always transmitted to the server 2. This enables the server 2 to appropriately determine the quality of the product. That is, it is possible to prevent the product quality from degrading using this embodiment. Thus, the quality management can be performed appropriately even by employing this embodiment.

Second Embodiment

Next, a second embodiment will be described. In the second embodiment, the method of deciding the transmission frequency at which the data file is transmitted to the server 2 differs from that in the first embodiment. A configuration of the second embodiment other than the method of determining the transmission frequency is substantially the same as that of the first embodiment. A hardware configuration of a data management system 1 according to the second embodiment is substantially the same as that shown in FIGS. 1 to 3, and thus the descriptions thereof will be omitted.

Figure 11:
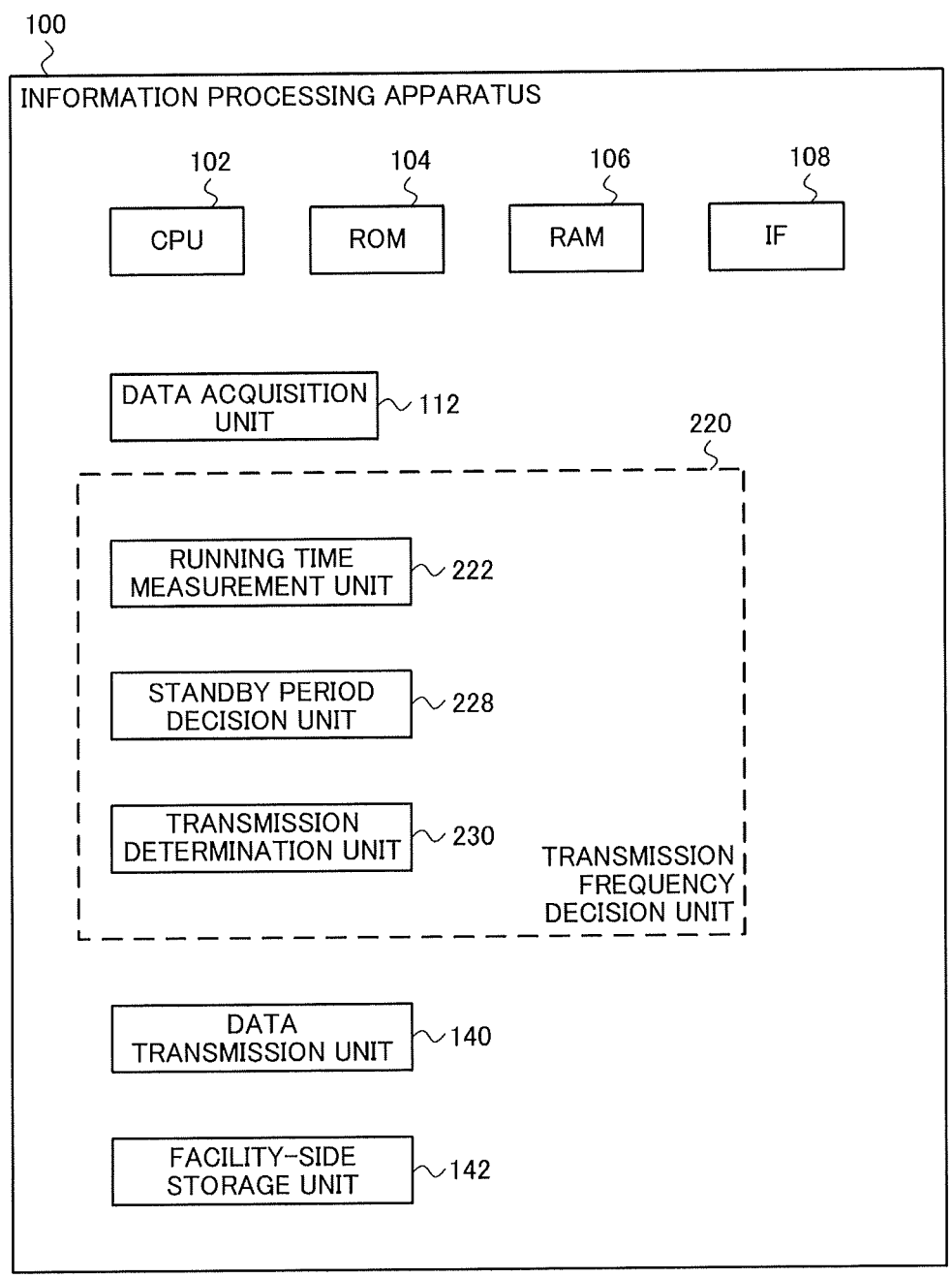
FIG. 11 is a view showing a configuration of an information processing apparatus according to a second embodiment.

FIG. 11 is a view showing a configuration of the information processing apparatus 100 according to the second embodiment. The information processing apparatus 100 according to the second embodiment includes a CPU 102, a ROM 104, a RAM 106, and an interface unit 108. The information processing apparatus 100 according to the second embodiment further includes a data acquisition unit 112, a transmission frequency decision unit 220, a data transmission unit 140, and a facility-side storage unit 142. The transmission frequency decision unit 220 includes a running time measurement unit 222, a standby period decision unit 228, and a transmission determination unit 230.

Figure 12:
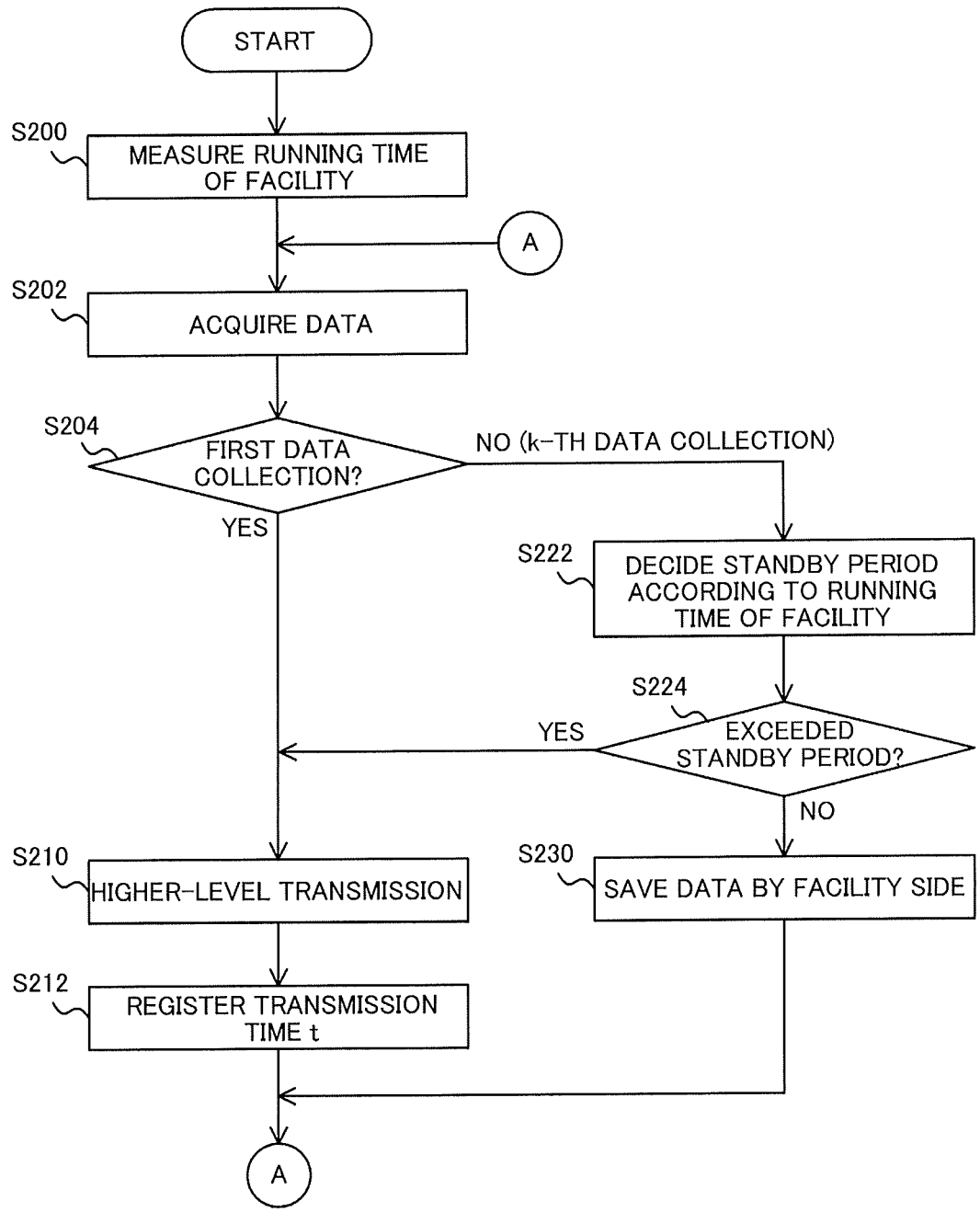
FIG. 12 is a flowchart showing a data management method performed by the information processing apparatus according to the second embodiment.

FIG. 12 is a flowchart showing a data management method performed in the information processing apparatus 100 according to the second embodiment. The processing shown in FIG. 12 is performed for each of the facilities 50 related to each information processing apparatus 100. The running time measurement unit 222 measures the running time of the facility 50 (Step S200). The data acquisition unit 112 acquires the data file including the operation state data 22 from the PLC 30 (Step S202). The transmission frequency decision unit 220 evaluates whether the processing of S202 is first data collection (Step S204). When the processing of S202 is the first data collection (YES in S204), the data transmission unit 140 transmits the data file of the operation state data 22 to the server 2 (Step S210). Then, the information processing apparatus 100 registers a time t at which the data file of the operation state data 22 is transmitted (Step S212).

When the data acquisition unit 112 acquires the data file of the k-th (k>2) cycle (NO in S202 and S204), the standby period decision unit 228 decides the standby period according to the running time of the facility 50 measured by the running time measurement unit 222 (Step S222). Specifically, the standby period decision unit 228 determines the standby period in such a way that the longer the running time, the shorter the standby period becomes. Thus, the longer the running time, the higher the transmission frequency of the data file becomes. Usually, the degradation of the facility 50 tends to progress as the running time becomes longer. Thus, the standby period decision unit 228 increases the transmission frequency of the data file as the running time increases, assuming that the degradation of the facility 50 is progressing. For example, the standby period decision unit 228 may shorten the standby period each time the running time increases by one year.

The transmission determination unit 230 determines whether the time since the previous higher-level transmission (S210) exceeds the standby period decided in the processing of S222 (Step S224). Specifically, the transmission determination unit 230 determines whether the time since the previous higher-level transmission time t to the present has exceeded the decided standby period. When the standby period has not been exceeded (NO in S224), the transmission determination unit 230 determines not to transmit the data file to the server 2. In such a case, the facility-side storage unit 142 of the information processing apparatus 100 stores the data file. That is, the facility-side system 4 saves the data (Step S230). On the other hand, when the time since the previous higher-level transmission time t to the present exceeds the standby period (YES in S224), the transmission determination unit 230 determines to transmit the data file to the server 2. In that case, the data transmission unit 140 transmits the data file to the server 2 (S210), and the transmission time t is registered (S212).

The information processing apparatus 100 according to the second embodiment is configured to decide the transmission frequency at which the operation state data 22 (the facility data) is transmitted to the server 2 in such a way that the longer the running time of the facility 50 is, the higher the transmission frequency becomes, assuming that the degradation state of the facility 50 is progressing. Like the first embodiment, this makes it possible to store necessary data in the server (the data storage unit 8) while effectively preventing information processing resources such as storage resources and network resources of the server 2 from being consumed.

Further, the information processing apparatus 100 according to the second embodiment decides the standby period simply by the length of the running time without performing the processing such as the calculation of the reference value, which is performed in the first embodiment. Thus, the progress of the degradation state can be evaluated by processing simpler than that in the first embodiment. On the other hand, the relationship between the running time and the progress of the degradation state may vary depending on the use situation of the facility 50 or the like. For this reason, the method according to the second embodiment may be less accurate in the determination of the progress of the degradation state as compared with the first embodiment.

Third Embodiment

Next, a third embodiment will be described. In the third embodiment, the method of determining the transmission frequency at which the data file is transmitted to the server 2 differs from that of the other embodiments. A configuration according to the third embodiment other than the method of determining the transmission frequency is substantially the same as that of the first embodiment. A hardware configuration of a data management system 1 according to the third embodiment is substantially the same as that shown in FIGS. 1 to 3, and thus the descriptions thereof will be omitted.

Figure 13:
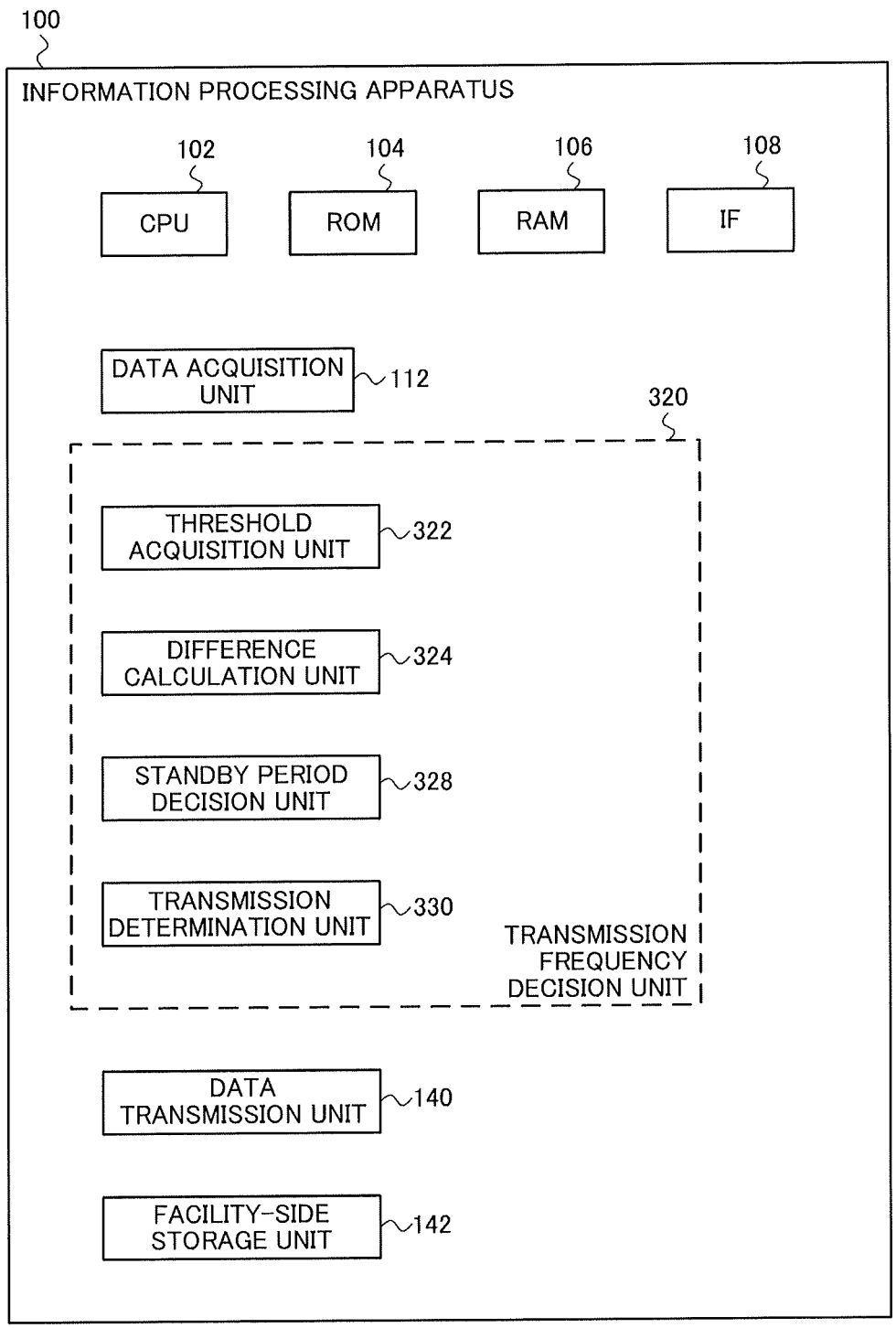
FIG. 13 is a view showing a configuration of an information processing apparatus according to a third embodiment.

FIG. 13 is a view showing a configuration of the information processing apparatus 100 according to the third embodiment. The information processing apparatus 100 according to the third embodiment includes a CPU 102, a ROM 104, a RAM 106, and an interface unit 108. The information processing apparatus 100 according to the third embodiment further includes a data acquisition unit 112, a transmission frequency decision unit 320, a data transmission unit 140, and a facility-side storage unit 142. The transmission frequency decision unit 320 includes a threshold acquisition unit 322, a difference calculation unit 324, a standby period decision unit 328, and a transmission determination unit 330.

Figure 14:
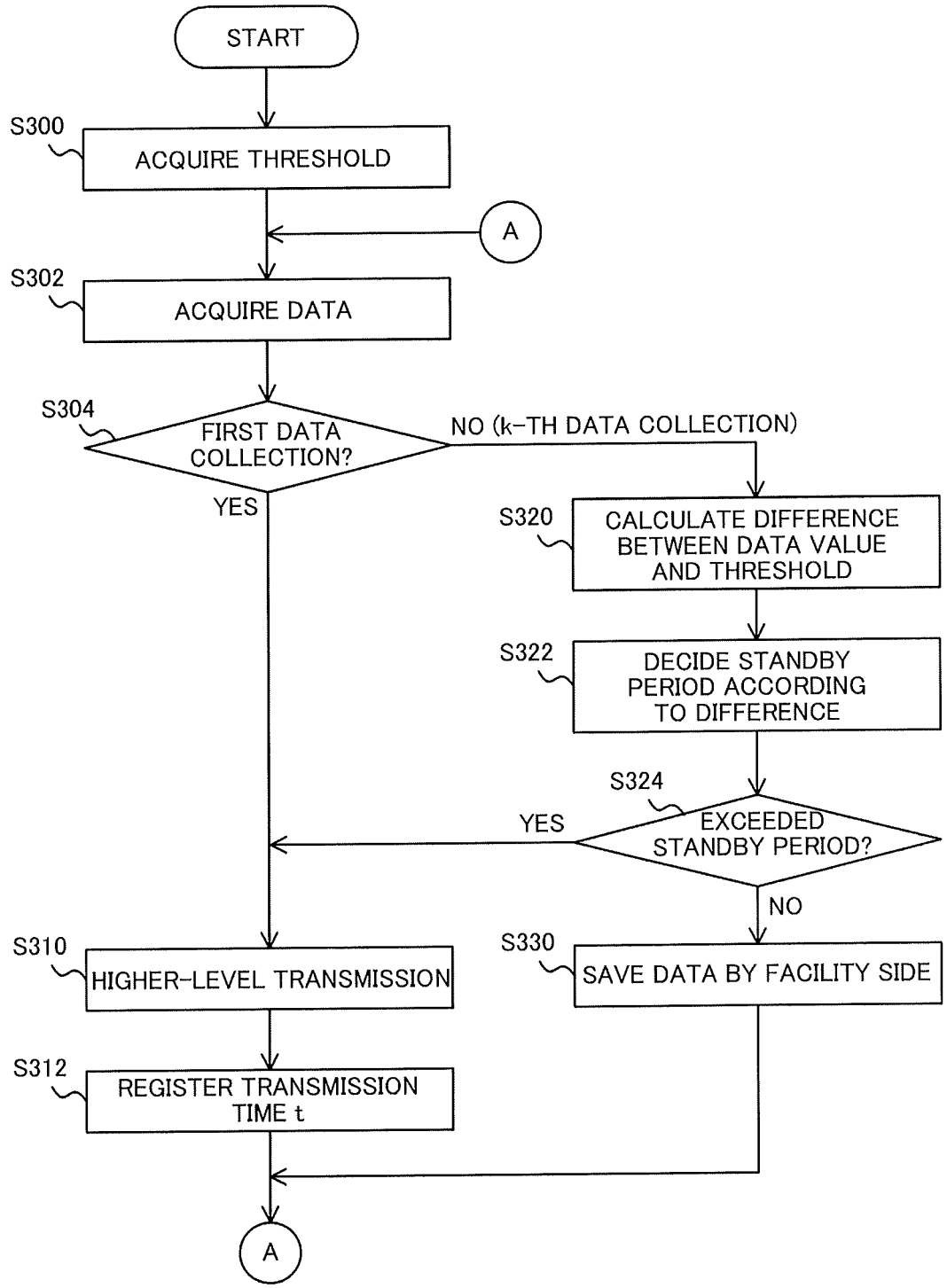
FIG. 14 is a flowchart showing a data management method performed by the information processing apparatus according to the third embodiment.

FIG. 14 is a flowchart showing a data management method performed in the information processing apparatus 100 according to the third embodiment. The processing shown in FIG. 14 is performed for each of the facilities 50 related to each information processing apparatus 100. The threshold acquisition unit 322 acquires, from the server 2, a threshold Th that serves as a reference for determining an abnormality sign (Step S300). In the third embodiment, it is assumed that the threshold Th is determined in advance in the server 2. Then, the server 2 may verify the validity of the threshold Th using the operation state data 22 transmitted from the information processing apparatus 100, and update the threshold Th as necessary.

The data acquisition unit 112 acquires a data file including the operation state data 22 from the PLC 30 (Step S302). The transmission frequency decision unit 320 evaluates whether the processing of S302 is first data collection (Step S304). When the processing of S302 is the first data collection (YES in S304), the data transmission unit 140 transmits the data file of the operation state data 22 to the server 2 (Step S310). Then, the information processing apparatus 100 registers a time t at which the data file of the operation state data 22 is transmitted (Step S312).

When the data acquisition unit 112 acquires the data file of the k-th (k>2) cycle (NO in S302 and S304), the difference calculation unit 324 calculates a difference between the value of the operation state data 22 of the data file and the threshold Th (Step S320). Here, the difference calculation unit 324 may calculate a difference $\Delta 3$ between the mean value $\mu k$ of the operation state data 22 included in the data file and the threshold Th.

The standby period decision unit 328 decides the standby period according to the difference $\Delta 3$ calculated in the processing of S320 (Step S322). Specifically, the standby period decision unit 328 decides the standby period in such a way that the smaller the difference $\Delta 3$, i.e., the closer the value of the operation state data 22 (the mean value $\mu k$) is to the threshold Th, the shorter the standby period becomes. An example of the method of deciding the standby period will be described with reference to FIG. 15.

Figure 15:
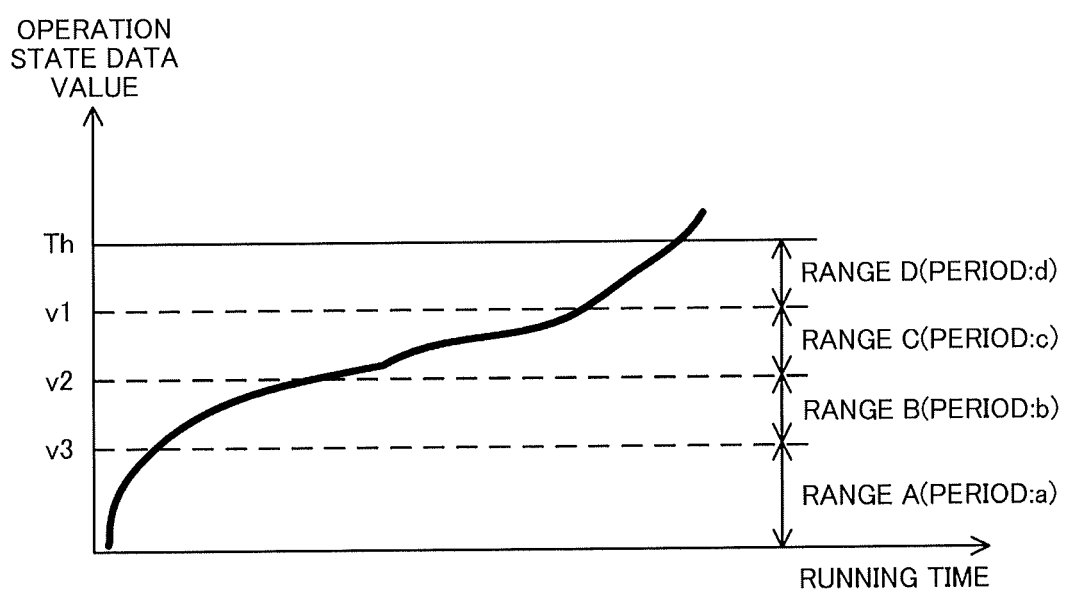
FIG. 15 is a view for describing a method of deciding a standby period according to the third embodiment.

FIG. 15 is a view for describing the method of deciding the standby period according to the third embodiment. In the operation state data 22 in the example shown in FIG. 15, degradation progresses as the value thereof increases. The threshold Th of the operation state data 22 determined to include an abnormality sign in the facility 50 and boundary values v1, v2, and v3 (v1>v2>v3>0) of the operation state data 22 are preset.

When the value of the operation state data 22 (the mean value $\mu k$) is in the range A, which is 0 to v3 (0 or greater and less than v3), the standby period decision unit 328 sets the standby period as the period a. When the value of the operation state data 22 (the mean value μk) is in the range B, which is v3 to v2 (v3 or greater and less than v2), the standby period decision unit 328 sets the standby period as the period b. When the value of the operation state data 22 (the mean value μk) is in the range C, which is v2 to v1 (v2 or greater and less than v1), the standby period decision unit 328 sets the standby period as the period c. When the value (the mean value μk) of the operation state data 22 is in the range D, which is v1 to Th (v1 or greater and less than Th), the standby period decision unit 328 sets the standby period as the period d. Here, the closer the value of the operation state data 22 (the mean value μk) is to the threshold value Th, the shorter the standby period becomes. That is, a≥b≥c≥d.

Next, the transmission determination unit 330 determines whether the time since the previous higher-level transmission (S310) exceeds the standby period decided in the processing of S322 (Step S324). Specifically, the transmission determination unit 330 determines whether the time since the previous higher-level transmission time t to the present has exceeded the decided standby period. When the standby period has not been exceeded (NO in S324), the transmission determination unit 330 determines not to transmit the data file to the server 2. In that case, the facility-side storage unit 142 of the information processing apparatus 100 stores the data file. That is, the facility-side system 4 saves the data (Step S330). On the other hand, when the time since the time t to the present exceeds the standby period (YES in S324), the transmission determination unit 330 determines to transmit the data file to the server 2. In such a case, the data transmission unit 140 transmits the data file to the server 2 (S310), and the transmission time t is registered (S312).

The information processing apparatus 100 according to the third embodiment is configured to increase the transmission frequency at which the operation state data 22 (the facility data) is transmitted to the server 2 as the value related to the operation state data 22 (the mean value μk) is closer to the threshold Th, assuming that the degradation state of the facility 50 is progressing. This makes it possible, like the first embodiment and so on, to store necessary data in the server (the data storage unit 8) while effectively preventing information processing resources such as storage resources and network resources of the server 2 from being consumed.

Further, the information processing apparatus 100 according to the third embodiment decides the standby period by the difference between the value of the operation state data 22 and the predetermined threshold Th without performing the processing such as the calculation of the reference value, which is performed in the first embodiment. Thus, the progress of the degradation state can be evaluated by processing simpler than that in the first embodiment. As described above, in the second embodiment, since the relationship between the running time and the progress of the degradation state can vary depending on the use situation and the like of the facility 50, there is a possibility that the accuracy of the determination on the progress of the degradation state is not high. On the other hand, in the third embodiment, the standby period is determined based on the difference between the operation state data 22 and the threshold Th, and thus it is possible to evaluate the progress of the degradation state more accurately than in the second embodiment. However, in the third embodiment, it is necessary to set the threshold value Th in advance.

Modified Example

Note that the present disclosure is not limited to the above-described embodiments, and can be appropriately changed without departing from the spirit of the present disclosure. For example, the order of the steps of the flowchart shown in FIG. 5 etc. can be appropriately changed. In the flowchart of FIG. 5 etc., the data file acquired at the first time is always transmitted to the server 2. However, it is not necessary to transmit the data file acquired at the first time to the server 2.

In the first embodiment, the reference value (the reference mean value μ) is calculated using the acquired data file at the first time, but the configuration is not limited to such a configuration. The reference value may be calculated using a data file other than the data file of the first cycle. For example, the reference value may be calculated in a specific cycle (e.g., second to third times etc.) in which degradation is considered to barely progress. In this case, the processing of S120 to S124 in FIG. 5 may be performed from the next cycle of the cycle of the data file used to calculate the reference value.

In the first embodiment, the case in which the number of data ranges is four (the ranges A, B, C, and D) is illustrated in FIG. 6, but the number of data ranges is not limited to four. Therefore, the number of standby periods may be any number. Furthermore, the number of data ranges and standby periods may be set as appropriate for each facility 50.

In the above-described embodiments, the data file in which the operation state data 22 is collected is transmitted to the server 2 in each cycle, but the configuration is not limited to such a configuration. The information processing apparatus 100 does not need to transmit the operation state data 22 to the server 2 in a form of the data file. The information processing apparatus 100 may transmit each piece of the operation state data 22 to the server 2.

Further, the information processing apparatus according to the above-described embodiments are configured to increase the transmission frequency in a stepwise fashion as degradation progresses, but the configuration is not limited to such a configuration. The transmission frequency (or the standby period) may be expressed by a function of the parameter indicating the progress of degradation, and the transmission frequency may be changed according to the parameter. For example, in the first embodiment, the standby period may be a function of the difference between the reference mean value μ and the mean value μk of the k-th data file. In the second embodiment, the standby period may be a function of the running time. Further, in the third embodiment, the standby period may be a function of the difference Δ3 between the threshold Th and the operation state data. The present disclosure also includes such a configuration.

In the above examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information processing apparatus comprising:
a processor configured to
acquire facility data indicating information related to a facility;
transmit the facility data acquired by the processor to a data storage unit that stores the facility data; and
decide a facility data frequency at which the processor transmits the facility data to the data storage unit in such a way that the facility data frequency at which the facility data is transmitted when a degradation state of the facility is progressing becomes higher than the facility data frequency at which the facility data is transmitted when the degradation state of the facility is not progressing,
wherein the facility data includes quality data used for determining quality of a workpiece processed by the facility and operation state data indicating an operation state of the facility, and
wherein the processor is further configured to decide an operation state data frequency at which the processor transmits the operation state data to the data storage unit.

2. The information processing apparatus according to claim 1, wherein the processor is configured to increase the facility data frequency at which the facility data is transmitted as a running time of the facility becomes longer, assuming that the degradation state of the facility is progressing.

3. The information processing apparatus according to claim 1, wherein the processor is configured to calculate a reference value of the facility data and increase the facility data frequency at which the facility data is transmitted as a difference between the reference value and a value related to the facility data becomes greater, assuming that the degradation state of the facility is progressing.

4. The information processing apparatus according to claim 1, wherein, when the facility is evaluated as abnormal when the value related to the facility data reaches a predetermined threshold, the processor is configured to increase the facility data frequency at which the facility data is transmitted as the value related to the facility data becomes closer to the threshold, assuming that the degradation state of the facility is progressing.

5. The information processing apparatus according to claim 1, wherein all of the quality data is transmitted to the data storage unit.

6. A data management system comprising:
a processor configured to acquire facility data indicating information related to a facility; and
a data storage unit configured to store the facility data,
wherein the processor is further configured to
transmit the facility data acquired by the processor to the data storage unit; and
decide a facility data frequency at which the processor transmits the facility data to the data storage unit in such a way that the facility data frequency at which the facility data is transmitted when a degradation state of the facility is progressing becomes higher than the facility data frequency at which the facility data is transmitted when the degradation state of the facility is not progressing,
wherein the facility data includes quality data used for determining quality of a workpiece processed by the facility and operation state data indicating an operation state of the facility, and
wherein the processor is further configured to decide an operation state data frequency at which the processor transmits the operation state data to the data storage unit.

7. A data management method comprising:
acquiring facility data indicating information related to a facility;
deciding a facility data frequency at which the facility data is transmitted to a data storage unit in such a way that the facility data frequency at which the facility data is transmitted when a degradation state of the facility is progressing becomes higher than the facility data frequency at which the facility data is transmitted to the data storage unit when the degradation state of the facility is not progressing; and
transmitting the facility data to the data storage unit at the decided first frequency, wherein
the facility data includes quality data used for determining quality of a workpiece processed by the facility and operation state data indicating an operation state of the facility, and
the method further comprises deciding an operation state frequency at which the operation state data is transmitted to the data storage unit.

8. A non-transitory computer readable medium storing a program for causing a computer to execute:
acquiring facility data indicating information related to a facility;
deciding a facility data frequency at which the facility data is transmitted to a data storage unit in such a way that the facility data frequency at which the facility data is transmitted when a degradation state of the facility is progressing becomes higher than the facility data frequency at which the facility data is transmitted to the data storage unit when the degradation state of the facility is not progressing; and
performing control to transmit the facility data to the data storage unit at the decided first frequency, wherein
the facility data includes quality data used for determining quality of a workpiece processed by the facility and operation state data indicating an operation state of the facility, and
the program further causes the computer to execute deciding an operation state frequency at which the operation state data is transmitted to the data storage unit.

* * * * *